R. U. ETZENSBERGER.
Coffee-Pot.
No. 218,867. Patented Aug. 26, 1879.
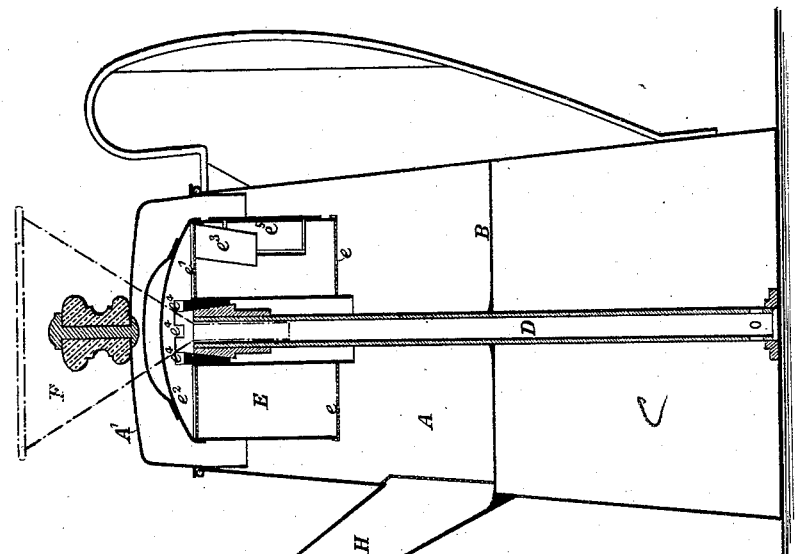
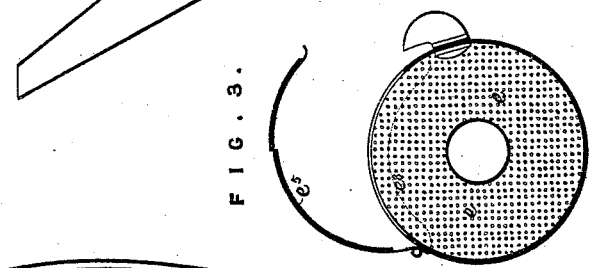
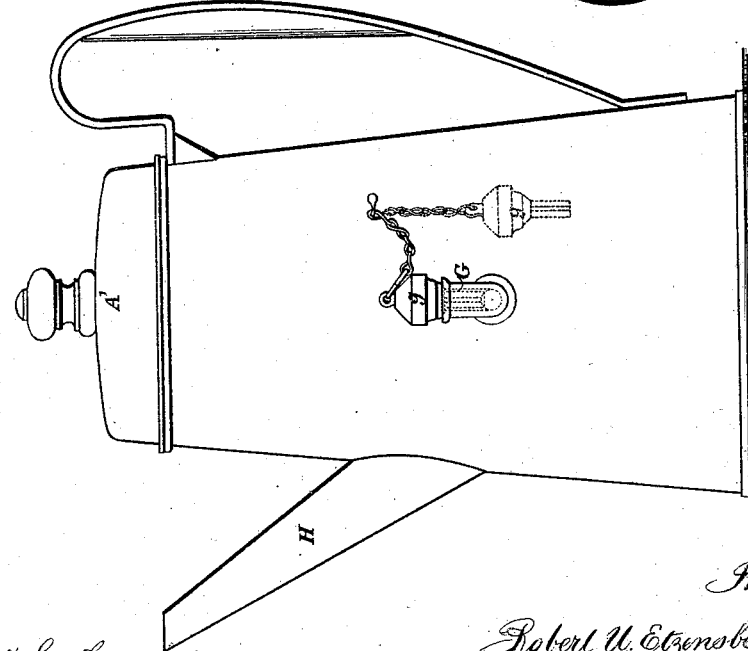
Witnesses
Chas. H. Smith
Geo. T. Pinckney
Inventor
Robert U. Etzensberger
for Lemuel W. Serrell
Atty.

UNITED STATES PATENT OFFICE.

ROBERT U. ETZENSBERGER, OF LONDON, ENGLAND.

IMPROVEMENT IN COFFEE-POTS.

Specification forming part of Letters Patent No. 218,867, dated August 26, 1879; application filed June 13, 1879.

*To all whom it may concern:*

Be it known that I, ROBERT ULRICH ETZENSBERGER, of London, England, have invented a new and useful Improved Coffee-Pot, the improvements in which are fully set forth in the following specification, reference being had to the accompanying drawings.

My invention consists in a novel combination and adaptation of known parts for the purpose of producing a coffee-pot which is simple in construction, effective and convenient in application, and of such an exterior as to be capable of receiving any desired artistic embellishments like coffee-pots of ordinary construction. This coffee-pot is used with a gas or spirit lamp of any known or suitable form.

Figure 1 is an outside view of the coffee-pot; Fig. 2, a vertical section through same, and Fig. 3 a horizontal section of the vessel containing the coffee to be extracted.

It consists, mainly, of a vessel which, by a partition, B, is divided into an upper compartment, A, closed by means of a lid, A', for the extracted coffee, and a lower closed compartment, C, for the hot water.

A water-ascension pipe, D, is fastened water-tight in the partition B, and passes to the bottom of the water-compartment C, resting in a socket on the bottom, and provided with one or more openings communicating with the compartment C, and situated about a quarter of an inch above the bottom, so as to leave a small quantity of water therein, and thus prevent the bottom of the coffee-pot from being burned when kept standing over a lamp-flame. The pipe D passes up through the upper or coffee compartment, A, and is formed conical at the top, terminating flush with top of compartment A.

E is a receptacle for the ground coffee from which an extract is to be made. This receptacle fits with a ground joint on the top of the ascension-pipe D. The female part fitting on the top of the pipe D is provided with notches, as shown at $e^4$, to insure a water-way even though, through inaccuracy of workmanship, this part should be made to project too far, so as to reach the top of the receptacle E. The bottom of the notches is slightly above the upper perforated partition, $e^1$, of the receptacle, in order to make sure that no made coffee or water tainted with coffee shall by any possibility flow back into the pipe D, and thus get into the water-compartment C.

The receptacle E is shown in horizontal section at Fig. 3, and has a door, $e^5$, on one side for putting the ground coffee in and for removing the used or spent grounds. $e^3$ is a shield above the door for preventing the rush of water to the door, and for the purpose of deflecting the current downward. The receptacle is formed with a perforated bottom, $e$. $e^2$ is a compartment above the perforated upper partition, $e^1$.

F is a funnel. (Shown in dotted lines.) This funnel, when placed in the pipe D, (after removal of lid A' and receptacle E;) serves to fill the water-compartment C.

G is a water-overflow and air pipe on the latter, fitted with a ground-in cone plug or cap, $g$, which serves also as a safety-valve.

The mode of using this coffee-pot is as follows: Remove the lid A' and the receptacle E, insert the funnel F, and then run water (hot, if possible) until it flows out of the opened overflow or air pipe G. Then reduce the water-level by drawing off a cupful through the pipe G, (or else pour in the required quantity of water only.) The funnel F being removed, the receptacle E, filled with ground coffee and closed, is placed on the pipe D and the lid A' put on. The pot is then put over the lamp. When steam issues from the air-pipe G the plug $g$ must be put into the overflow or air-pipe G. Very shortly after the steam-pressure generated in the water-compartment C will cause the boiling water to rise in the pipe D and to enter the upper compartment, $e^2$, of the receptacle E, and, passing down slowly through the perforated partition $e^1$, will, through the perforated bottom $e$ of the receptacle E, issue into the upper compartment, A, of the pot in the form of coffee-extract, or, as it is termed, "coffee." The valve $g$ now acts as a safety-valve, and if the steam-pressure should become too great the heat from the lamp should be somewhat reduced. When no more steam escapes by the safety-valve $g$ the operation is completed, the pot can be removed, and after cooling a few minutes the coffee may be poured out from the spout H.

Having thus described my invention, I declare that I am aware it is not new to construct an apparatus for making extracts in two distinct and separate vessels united by a pipe-joint; nor do I claim the mode of action hereinbefore described; but

I claim—

1. In a domestic coffee-pot divided by a partition, B, into a lower compartment, C, and an upper compartment, A, with a spout, H, the ascension-pipe D, fastened to the bottom of the pot, and also serving as a water-filling pipe, in combination with the coffee-receptacle E, fitting upon said pipe D, the pipe G, opening into the lower compartment, C, and serving as an air-pipe, and the safety-valve $g$, resting upon the pipe G, all constructed and arranged substantially as shown.

2. The combination, in a coffee-pot, of a receptacle, E, for the ground coffee, fitting on the pipe D, and a vessel with upper compartment, $e^2$, perforated walls $e^1$ and $e$, and deflector-shield $e^3$, constructed and arranged substantially as shown.

R. U. ETZENSBERGER.

Witnesses:
HENRY CHAS. COOTE,
    37 *Cursitor Street.*
PETER JANSEN,
    33 *Chancery Lane.*